United States Patent [19]

Lamy et al.

[11] Patent Number: 4,492,130
[45] Date of Patent: Jan. 8, 1985

[54] DEVICE FOR FILTERING OUT VIBRATIONS AND NOISE

[75] Inventors: Jean-Michel Lamy, Paris; Albert Le Bail, Nanterre, both of France

[73] Assignee: Regie Nationale des Usines Renault, Boulogne-Billancourt, France

[21] Appl. No.: 408,121

[22] Filed: Aug. 13, 1982

[30] Foreign Application Priority Data

Aug. 14, 1981 [FR] France .................. 81 15743

[51] Int. Cl.³ .................. G05G 9/12; F16C 11/08
[52] U.S. Cl. .................. 74/473 P; 403/132
[58] Field of Search .............. 74/473 P; 403/132, 133, 403/135, 140, 122, 225; 248/481, 482, 483, 288.3, 288.5

[56] References Cited

U.S. PATENT DOCUMENTS

| 2,062,290 | 12/1936 | Bott | 403/225 X |
|---|---|---|---|
| 2,578,809 | 12/1951 | Ketchum | 403/225 X |
| 3,539,234 | 11/1970 | Rapata | 308/238 |
| 3,845,557 | 11/1974 | Bailey | 30/381 |
| 4,295,691 | 10/1981 | Rubenthaler | 308/238 |

FOREIGN PATENT DOCUMENTS

| 203783 | 6/1959 | Austria | 403/135 |
|---|---|---|---|
| 518748 | 4/1953 | Belgium . | |
| 1098381 | 1/1961 | Fed. Rep. of Germany | 403/133 |
| 2025904 | 12/1971 | Fed. Rep. of Germany . | |
| 2157355 | 5/1973 | Fed. Rep. of Germany | 403/132 |
| 2460769 | 1/1976 | Fed. Rep. of Germany . | |
| 680434 | 4/1930 | France . | |
| 1157282 | 12/1957 | France | 403/133 |
| 2022743 | 10/1970 | France . | |
| 2363024 | 3/1978 | France . | |
| 2378985 | 8/1978 | France . | |

Primary Examiner—Allan D. Herrmann
Attorney, Agent, or Firm—Owen, Wickersham & Erickson

[57] ABSTRACT

The ball joint (2) of an automotive vehicle's gear lever (1) is mounted in an intermediate component (5) comprising a massive base connected to a movable element (4) and possesses projecting protuberances (12) on its surface which faces the other fixed element (6).

4 Claims, 4 Drawing Figures

DEVICE FOR FILTERING OUT VIBRATIONS AND NOISE

The present invention relates to a filtering device with limited wasted travel working between two elements that have to be insulated from each other in regard to vibrations and/or noise, comprising an intermediate filter component made of an elastically deformable material and placed between the two above-mentioned elements.

It is necessary, in order to make any vibration and/or noise filter effective, for the filter component to be very flexible, since very low energy levels are involved in these vibrations.

If, at the same time, the filter component undergoes or has to transmit very large forces its great flexibility brings about considerable deformation, which could only be reduced by using a relatively rigid component thus detracting from the filtering effect.

These two contradictory requirements are met with, for example, in systems for isolating a gearbox control from the floor of an automotive vehicle. When operating the gear change control the vehicle's driver applies very substantial forces, which results in significant and prohibitive idle movement or wasted travel in operation when a filtering device is used that is designed to deal with vibrations and/or noise (flexible filter component) rather than with the forces to be transmitted (rigid filter component).

The object of this invention is a filter device, notably for the gear change control of an automotive vehicle, providing both good filtering of vibrations and/or noise and transmission of the forces with limited wasted travel.

According to the invention the intermediate component is elastically deformable material placed between the two elements to be isolated from each other with respect to vibrations and/or noise is made of a material possessing medium to high hardness and comprises a massive base connected to one of the said elements having, projecting from its surface opposite the other of the said elements, shallow protuberances of small cross-sectrion; the tops only of the protuberances bear against the said other element when no load is applied to the intermediate component, whilst the said protuberances are crushed under the effect of a load until the massive base of the intermediate component comes into contact with the said other element.

The projecting protuberances on the surface of the massive base of the intermediate component thus filter out the vibrations and/or noise due to the great flexibility of the said protuberances. On the other hand, as soon as the intermediate component has forces applied to it the said forces are, after the shallow protuberances have been crushed, i.e. after a short wasted or idle travel, directly transmitted by the massive base, which can withstand the said forces without being destroyed or distorted significantly.

In order to prevent excessive stresses on the protuberances when these forces are being transmitted it is advantageous to hollow out the massive base round these protuberances.

It is advantageous for the protuberances to have a triangular cross-section, preferably roughly that of an isoceles triangle.

According to one embodiment the said protuberances come in the form of groups of protuberances separated by smooth areas, without protuberances, on the surface of the massive base.

From the moulding standpoint it is advantageous to make the protuberances in the form of teeth.

It is preferable to use a moulded synthetic rubber having a Shore hardness number of between 50 and 70.

With references to the appended drawings, a more detailed description will be given of an embodiment which is illustrative and not restrictive of a filter device according to the invention applied to isolating the gear change control from the floor of an automotive vehicle; in the drawings.

Figure 1:
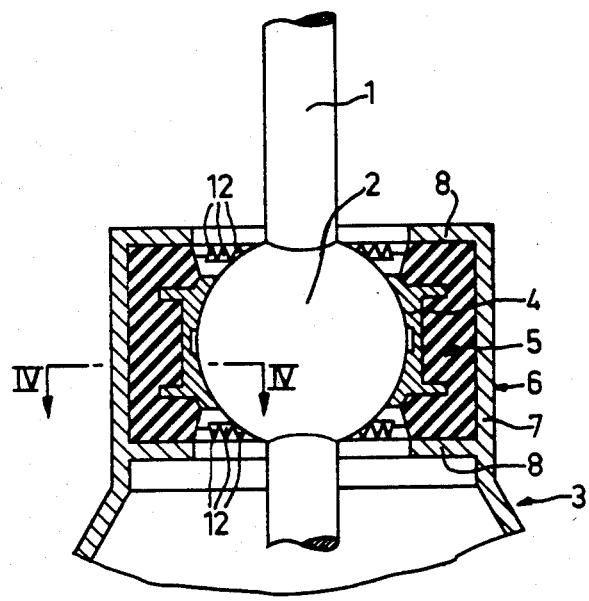
FIG. 1 is an axial section of an automotive vehicle gear change lever support with the filter device according to the invention between the said support and the control lever ball joint.

In accordance with FIG. 1, an automotive vehicle's gear change control lever 1 comprises a carrier or ball joint 2 mounted in a support 3 fixed, for example, to the floor of an automotive vehicle. The ball joint 2 is mounted in a spherical bearing 4 carried by an intermediate filter component 5 mounted in a housing 6 on the support 3. This housing 6 comprises a cylindrical section 7 and an inside flange 8 at each end of the cylindrical section 7.

Figure 4:
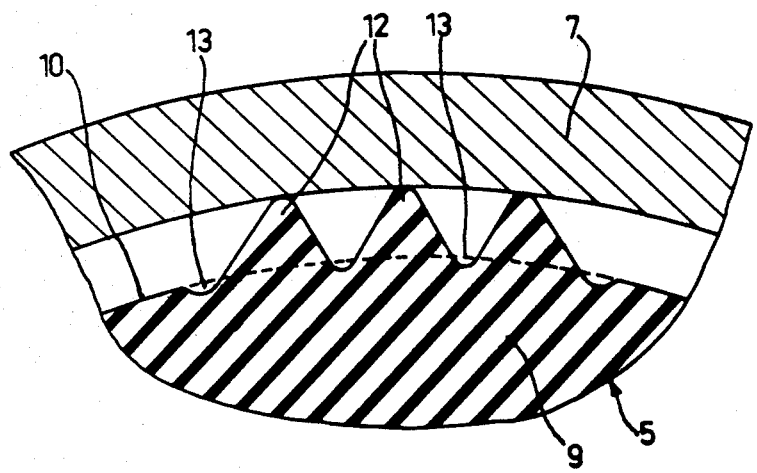
FIG. 4 is a part section view along IV—IV in FIG. 1, on a larger scale.
Figure 2:
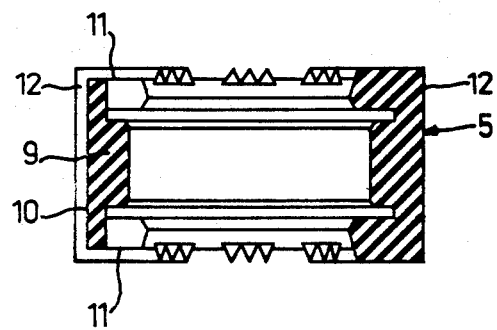
FIG. 2 is an axial section of the intermediate filter component of this device, along II—II in FIG. 3.
Figure 3:
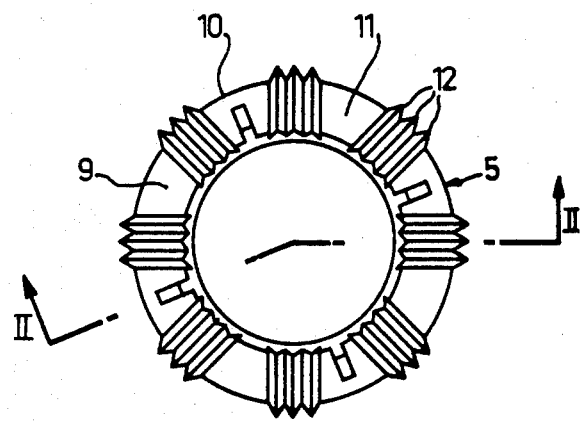
FIG. 3 is a plan view of the intermediate component of FIG. 1.

The intermediate filter component 5, made from a material like an elastomer having medium to high hardness, and made preferably from a moulded rubber with a Shore hardness of 60, has, in accordance with FIGS. 2 to 4, massive base 9 having an overall cylindrical shape. The massive base 9 carries several sets of teeth 12 on its cylindrical lateral surface 10 and on its two frontal surfaces 11. In the example shown eight sets of three teeth 12 project from the outer surfaces 10, 11 of the massive base 9 of component 5, with these teeth 12 extending from one of the frontal surfaces 11 across the lateral surface 10 to the other frontal surface 11.

In FIG. 4 it can be seen that the lateral surface 10 is slightly hollowed out at 13 around the teeth 12; this is the case on the frontal surfaces 11 as well as on the lateral surface 10.

Only the tops of the teeth 12, where here have an isoceles triangle cross-section, come into contact with the housing 6 (the cylindrical surface 7 in FIG. 4) when no load is applied to the intermediate filter component 5. Under these conditions this means that the intermediate component 5 has very little rigidity, thus providing effective filtering of vibrations and/or noise.

On the other hand when a load is applied on operating the gear change lever 1, this load is transmitted by the ball joint 2 and the spherical bearing 4 to the intermediate component 5. The latter's teeth 12 are thus squashed down to the level of the lateral surface 10, 11 of the massive base 9 of component 5. The surface 10, 11 of the massive base 9 thus comes into direct contact with part 7,8 of the support 3.

The load is thus transmitted after a relatively slight idle or wasted travel which is limited to the height of the teeth 12 above the outer surface 10, 11 of the massive base 9 of component 5. This wasted travel may be limited at will by the height of the teeth 12. Selection of the tooth 12 cross-section is made in accordance with the energy level of the vibrations and noises to filtered out.

Instead of the triangular teeth it is also possible to use other protuberances advantageously having a base cross-section which is greater, and preferably very much greater, than the tip cross-section. The converging sides of the protuberances may be straight or curved. It is preferable for the protuberances to only occupy, at the base thereof, a small portion of the surface of the massive base from which they project; this portion advantageously amounts to less than 50% and preferably even less than 30% of the said surface.

It is also advantageous for the height of the protuberances, which is small compared with the thickness of the massive base, to be equal to or greater than the width of the protuberances at their base.

Of course the filtering device may find other applications, apart from the ones described above, whenever it is required to combine the two complementary functions of low stiffness in a first stage and high stiffness in a second stage, in order to filter out vibrations and noise when there is no load and to transmit loads with a limited idle travel.

We claim:

1. In an automotive vehicle gearshift control assembly having a gear control lever with a ball thereon, a spherical bearing cup surrounding said ball, and a lever-ball support housing having an inner surface,
   a hollow one-piece filter component for filtering noise and vibration, located between said spherical bearing cup and said support housing,
   said filter component being made of a material having a Shore hardness of between 50 and 70 and having a massive base with an inner surface connected to said cup and an outer surface facing the inner surface of said housing,
   protuberances extending out from said outer surface and having a width greater where they meet said base than at their tip and a height smaller than their thickness where they meet said base and at least equal to the width of the protuberances where they meet said base,
   said protuberances occupying, where they meet said base, only a small portion of said outer surface of said base from which they project,
   only the tips of said protuberances bearing against said housing when no significant load is applied, and thus being effective for filtering vibration and noise,
   while under the effect of load applied when operating the gear control lever, said protuberances are crushed elastically until, after a limited idle travel corresponding to the height of said protuberances, said massive base comes into contact with said housing and then transmits said load without significant deformation of said massive base.

2. The device according to claim 1 wherein the massive base is grooved around said protuberances.

3. The device according to claim 1 wherein said protuberances are elongated teeth having a triangular cross-section.

4. The device according to claim 3 wherein said protuberances form groups of teeth separated by tooth-free areas on said outer surface of said massive base.

* * * * *